United States Patent
Liu et al.

(10) Patent No.: US 11,115,267 B2
(45) Date of Patent: Sep. 7, 2021

(54) METHOD AND DEVICE FOR RADIO LINK MONITORING

(71) Applicant: Telefonaktiebolaget LM Ericsson (publ), Stockholm (SE)

(72) Inventors: Jinhua Liu, Beijing (CN); Rui Fan, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/346,183

(22) PCT Filed: Oct. 30, 2017

(86) PCT No.: PCT/CN2017/108346
§ 371 (c)(1),
(2) Date: Apr. 30, 2019

(87) PCT Pub. No.: WO2018/082521
PCT Pub. Date: May 11, 2018

(65) Prior Publication Data
US 2020/0059404 A1  Feb. 20, 2020

(30) Foreign Application Priority Data
Nov. 4, 2016  (WO) ................ PCT/CN2016/104616

(51) Int. Cl.
*H04L 12/24* (2006.01)
*H04W 76/27* (2018.01)
(Continued)

(52) U.S. Cl.
CPC ......... *H04L 41/0806* (2013.01); *H04W 24/08* (2013.01); *H04W 76/27* (2018.02); *H04W 76/28* (2018.02)

(58) Field of Classification Search
CPC .. H04L 41/0806; H04W 24/08; H04W 24/10; H04W 76/27; H04W 76/28
See application file for complete search history.

(56) References Cited

U.S. PATENT DOCUMENTS 9,414,371 B2 * 8/2016 Pi ......................... H04W 72/042
9,456,358 B2 * 9/2016 Chen ..................... H04W 24/02
(Continued)

FOREIGN PATENT DOCUMENTS

BR    112018015975 A2 * 12/2018 ............... H04L 5/14
CA       3011194 A1 *  8/2017 ............... H04L 5/14
(Continued)

OTHER PUBLICATIONS

Zhongfeng et al., CN107404370, Espacenet English Translation, Description (Year: 2016).*
(Continued)

*Primary Examiner* — Eric Nowlin
(74) *Attorney, Agent, or Firm* — Withrow & Terranova, PLLC (57) ABSTRACT

Systems and methods are disclosed that relate to applying traffic type or network slice specific configuration for Radio Link Monitoring (RLM) in New Radio Access Technology (NR) for multiple service providing. There are multiple configurations for multiple services (or service sets)/networks slices, the configuration including the out-of-sync evaluation period and the in-sync evaluation period, the thresholds for out-of-sync evaluation and in-sync evaluation, and the associated counter values and timers. The method for RLM configuration of coexisting multiple services is also disclosed.

23 Claims, 8 Drawing Sheets

(51) Int. Cl.
*H04W 24/08* (2009.01)
*H04W 76/28* (2018.01)

(56) References Cited

U.S. PATENT DOCUMENTS

| | | | |
|---|---|---|---|
| 10,285,028 B2* | 5/2019 | Chincholi | H04W 4/70 |
| 10,390,262 B2* | 8/2019 | Tsuboi | H04W 24/08 |
| 10,820,248 B2* | 10/2020 | Gao | H04W 36/0061 |
| 2011/0217973 A1* | 9/2011 | Sagfors | H04L 69/32 |
| | | | 455/423 |
| 2013/0272263 A1* | 10/2013 | Pi | H04B 7/0626 |
| | | | 370/330 |
| 2015/0271763 A1* | 9/2015 | Balachandran | H04L 43/0811 |
| | | | 370/338 |
| 2017/0230780 A1* | 8/2017 | Chincholi | H04W 24/10 |
| 2018/0220438 A1* | 8/2018 | Liu | H04W 72/1289 |
| 2018/0249441 A1* | 8/2018 | Ryoo | H04L 5/0057 |
| 2018/0269950 A1* | 9/2018 | John Wilson | H04B 7/0626 |
| 2018/0351625 A1* | 12/2018 | Xu | H04L 1/00 |
| 2019/0052579 A1* | 2/2019 | Senarath | H04L 41/5048 |
| 2019/0053293 A1* | 2/2019 | Akoum | H04W 76/19 |
| 2019/0081675 A1* | 3/2019 | Jung | H04L 5/0048 |
| 2019/0081753 A1* | 3/2019 | Jung | H04L 1/1854 |
| 2019/0182000 A1* | 6/2019 | Futaki | H04L 5/005 |
| 2019/0261244 A1* | 8/2019 | Jung | H04W 36/305 |
| 2019/0305911 A1* | 10/2019 | Sarkis | H04L 5/006 |
| 2019/0349897 A1* | 11/2019 | Hosseini | H04W 72/048 |
| 2019/0379506 A1* | 12/2019 | Cheng | H04L 5/0051 |
| 2019/0380052 A1* | 12/2019 | Yang | H04W 72/042 |
| 2019/0394758 A1* | 12/2019 | Cheng | H04L 1/0061 |
| 2020/0028613 A1* | 1/2020 | Nam | H04L 5/0048 |
| 2020/0052864 A1* | 2/2020 | Hosseinian | H04L 5/0062 |
| 2020/0059404 A1* | 2/2020 | Liu | H04W 76/27 |
| 2020/0059987 A1* | 2/2020 | Hong | H04W 76/27 |
| 2020/0083944 A1* | 3/2020 | Xu | H04L 1/18 |
| 2020/0119836 A1* | 4/2020 | Lyu | H04L 1/0073 |
| 2020/0119893 A1* | 4/2020 | Zhang | H04L 5/0051 |
| 2020/0120584 A1* | 4/2020 | Yi | H04L 5/0048 |
| 2020/0128467 A1* | 4/2020 | Gao | H04W 36/32 |
| 2020/0145091 A1* | 5/2020 | Luo | H04W 24/08 |
| 2020/0170036 A1* | 5/2020 | Akoum | H04W 72/046 |
| 2020/0274657 A1* | 8/2020 | Deenoo | H04L 1/0026 |
| 2020/0413317 A1* | 12/2020 | Gao | H04W 48/16 |

FOREIGN PATENT DOCUMENTS

| | | | | |
|---|---|---|---|---|
| CN | 102487527 A | | 6/2012 | |
| CN | 103384382 A | | 11/2013 | |
| CN | 104584476 A | | 4/2015 | |
| CN | 104854927 A | | 8/2015 | |
| CN | 105122863 A | | 12/2015 | |
| CN | 108604949 A | * | 9/2018 | H04L 5/16 |
| EP | 3411974 A1 | * | 12/2018 | H04W 4/70 |
| EP | 3411974 B1 | * | 11/2020 | H04L 1/00 |
| EP | 3745623 A1 | * | 12/2020 | H04W 24/08 |
| GB | 2507570 A | | 5/2014 | |
| JP | 2016184853 A | | 10/2016 | |
| KR | 20180110669 A | * | 10/2018 | H04L 1/0036 |
| WO | 2013171576 A1 | | 11/2013 | |
| WO | 2014028346 A2 | | 2/2014 | |
| WO | 2014068535 A2 | | 5/2014 | |
| WO | 2016133777 A1 | | 8/2016 | |
| WO | WO-2017136666 A1 | * | 8/2017 | H04L 1/0046 |
| WO | 2019031899 A1 | | 2/2019 | |
| WO | WO-2020223659 A1 | * | 11/2020 | H04L 1/20 |

OTHER PUBLICATIONS

Zhongfeng et al., CN107404370, Espacenet English Translation, Claims (Year: 2016).*

Qualcomm Incorporated, RLM enhancements in Further enhanced MTC, Aug. 22, 2016, 3GPP, 3GPP TSG-RAN WG4 Meeting #80, Tdoc: R4-166625 (Year: 2016).*

Nokia et al., Discussion on RLM enhancement for feMTC, Oct. 10, 2016, 3GPP, 3GPP TSG-RAN WG4 Meeting #80bis, Tdoc: R4-168280 (Year: 2016).*

Ericsson, Introduction of enhanced RLM requirements forfeMTC, May 15, 2017, 3GPP, 3GPP TSG-RAN4 Meeting #83, Tdoc: R4-1706189 (Year: 2017).*

Chen et al., New Reference Signal Design for URLLC and eMBB Multiplexing in New Radio Wireless Communications, 2018, IEEE, 2018 IEEE 29th Annual International Symposium on Personal, Indoor, and Mobile Radio Communications (Year: 2018).*

Author Unknown, "Technical Specification Group Radio Access Network; Evolved Universal Terrestrial Radio Access (E-UTRA); Requirements for support of radio resource management (Release 12)," Technical Specification 36.133, Version 12.0.0, 3GPP Organizational Partners, Jul. 2013, 746 pages.

International Search Report and Written Opinion for International Patent Application No. PCT/CN2017/108346, dated Jan. 29, 2018, 11 pages.

AT&T, "R1-1609387: Initial Access and Mobility Requirements for NR," 3GPP TSG RAN1 Meeting #86bis, Oct. 10-14, 2016, Lisbon, Portugal, 6 pages.

Ericsson, "Tdoc R2-166931: Radio interface implications of network slicing," 3GPP TSG-RAN WG2 #95bis, Oct. 10-14, 2016, Kaohsiung, Taiwan, 7 pages.

Ericsson, "Tdoc R2-1704089: RLM and RLF In NR," 3GPP TSG-RAN WG2 #97bis, Apr. 3-7, 2017, Spokane, USA, 5 pages.

Intel Corporation, "R1-1716283: Radio Link Monitoring for NR," 3GPP TSG RAN WGl Meeting NR Ad-hoc #3, Sep. 18-21, 2017, Nagoya, Japan, 5 pages.

Samsung, "R2-166917: End-to-End Network Slicing: RAN Requirements," 3GPP TSG-RAN WG2 #95bis, Oct. 10-14, 2016, Kaohsiung, Taiwan, 3 pages.

Extended European Search Report for European Patent Application No. 17866682.2, dated Jul. 2, 2019, 10 pages.

Ericsson, et al., "Tdoc R2-093802: Providing per QCI radio link failure timers," 3GPP TSG-RAN WG2 #66bis, Jul. 2009, 2 pages, Los Angeles, California.

Notice of Reasons for Refusal for Japanese Patent Application No. 2019-523078, dated Jul. 14, 2020, 6 pages.

Examination Report for Indian Patent Application No. 201947017670, dated Apr. 8, 2021, 5 pages.

Examination Report for European Patent Application No. 17866682.2, dated Jul. 1, 2021, 11 pages.

* cited by examiner

METHOD AND DEVICE FOR RADIO LINK MONITORING

This application is a 35 U.S.C. § 371 national phase filing of International Application No. PCT/CN2017/108346, filed Oct. 30, 2017, which claims the benefit of International Application No. PCT/CN2016/104616, filed Nov. 4, 2016, the disclosures of which are incorporated herein by reference in their entireties.

TECHNICAL FIELD

The non-limiting and example embodiments of the present disclosure generally relate to the technical field of wireless communications, and specifically to a method, a network node, and a wireless device for radio link monitoring.

BACKGROUND

This section introduces aspects that may facilitate better understanding of the disclosure. Accordingly, the statements of this section are to be read in this light and are not to be understood as admissions about what is in the prior art or what is not in the prior art.

Various Latency Requirements in New Radio Access Technology (NR)

Fifth Generation (5G) is supposed to support multiple types of services using common Radio Access Network (RAN): enhanced Mobile Broadband (eMBB), massive Machine Type Communication (mMTC), and Ultra-Reliable and Low Latency Communication (URLLC). These services require different Quality of Service (QoS): delay, data rate, and packet loss rate, in particular:

URLLC requires low delay and/or high reliability;
mMTC typically requires long battery lifetime but does not require low delay or high data rate, often combined with small infrequent packets; and
eMBB requires high data rate. Delay can be strict but typically less strict than in URLLC.

Radio Link Monitoring (RLM) is one important feature to enable the radio link recovery. For new Radio Access Technology (RAT), there are traffics of various delay requirements (eMBB, URLLC, and mMTC).

The delay requirement of different traffics mentioned above are quite different: from very tight delay budget (e.g., <1 milliseconds (ms) for URLLC) to very long delay budget (e.g., several seconds for mMTC). For all types of radio resources, the Radio Link Monitoring (RLM) mechanism shall be applied to monitor the radio link performance.

RLM Mechanism in Long Term Evolution (LTE)

Figure 1:
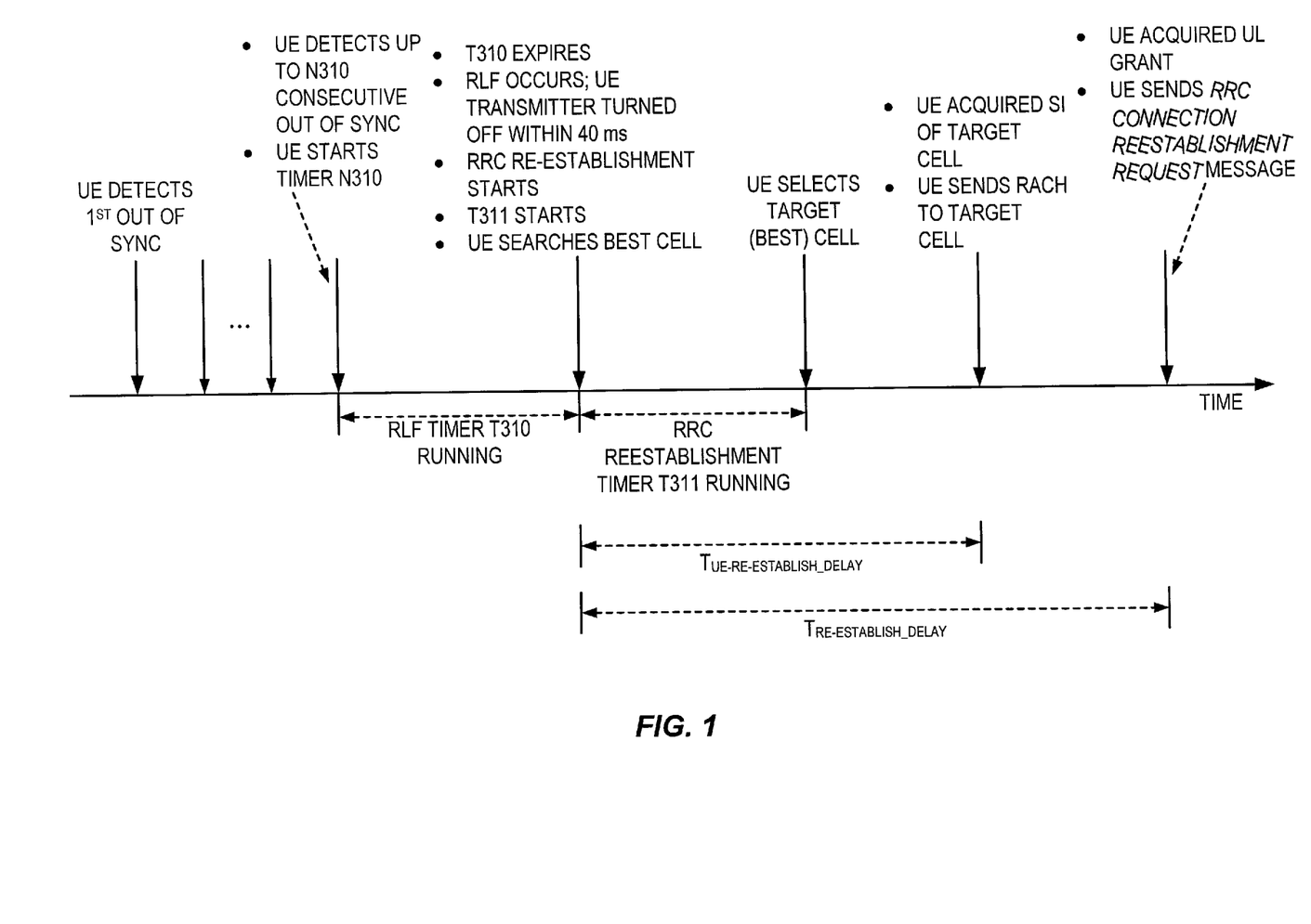
FIG. 1 illustrates various actions pertaining to Radio Link Monitoring (RLM) and the subsequent Radio Resource Control (RRC) reestablishment.

The purpose of the RLM function in a User Equipment device (UE) is to monitor the downlink radio link quality of the serving cell in RRC_CONNECTED state and is based on the cell specific Reference Signals (RSs). This in turn enables the UE when in RRC_CONNECTED state to determine whether it is in-sync or out-of-sync with respect to its serving cell. In case of a certain number of consecutive out-of-sync indications (called 'N310'), the UE starts a network-configured Radio Link Failure (RLF) timer 'T310.' The timer is stopped if a number 'N311' of consecutive in-sync indications are reported by the UE's physical layer. Both the out-of-sync and in-sync counters (N310 and N311) are configurable by the network. Upon expiry of the timer T310, RLF occurs. As a consequence, the UE turns off its transmitter to avoid interference and is required to re-establish the RRC connection within $T_{UE-re-establish\_delay}$ as explained. The various actions pertaining to RLM and the subsequent Radio Resource Control (RRC) reestablishment to the target cell are shown FIG. 1.

Requirements Without Discontinuous Reception (DRX)

When no DRX is configured, out-of-sync occurs when the downlink radio link quality estimated over the last 200 ms period becomes worse than the threshold $Q_{out}$. Similarly, without DRX the in-sync occurs when the downlink radio link quality estimated over the last 100 ms period becomes better than the threshold $Q_{in}$. Upon detection of out-of-sync, the UE initiates the evaluation of in-sync. The occurrences of out-of-sync and in-sync are reported internally by the UE's physical layer to its higher layers, which in turn may apply layer 3 (i.e., higher layer) filtering for the evaluation of RLF.

Requirements With DRX

When DRX is in use, in order to enable sufficient UE power saving the out-of-sync and in-sync evaluation periods are extended and depend upon the configured DRX cycle length. The UE starts in-sync evaluation whenever out-of-sync occurs. Therefore, the same period ($T_{Evaluate\_Qout\_DRx}$) is used for the evaluation of out-of-sync and in-sync. However, upon starting the RLF timer (T310) until its expiry, the in-sync evaluation period is shortened to 100 ms, which is the same as without DRX. If the timer T310 is stopped due to N311 consecutive in-sync indications, the UE performs in-sync evaluation according to the DRX based period ($T_{Evaluate\_Qout\_DRx}$).

The threshold $Q_{out}$ is defined as the level at which the downlink radio link cannot be reliably received and shall correspond to 10% Block Error Rate (BLER) of a hypothetical Physical Downlink Control Channel (PDCCH) transmission taking into account the Physical Control Format Indicator Channel (PCFICH) errors with transmission parameters specified in Table 7.6.1-1 of Third Generation Partnership Project (3GPP) Technical Specification (TS) 36.133-c00.

The threshold $Q_{in}$ is defined as the level at which the downlink radio link quality can be significantly more reliably received than at $Q_{out}$ and shall correspond to 2% BLER of a hypothetical PDCCH transmission taking into account the PCFICH errors with transmission parameters specified in Table 7.6.1-2 of 3GPP TS 36.133-c00.

Based on the results from the RLM, the UE can determine the RLF and trigger the cell selection and the radio connection reestablishment procedure.

SUMMARY

Due to the various Quality of Service (QoS) requirements of different services, using the uniform static parameter setting for the measurements and evaluation to determine out-of-sync, in-sync, and Radio Link Failure (RLF) is not optimal for NR.

For one instance, the out-of-sync evaluation of 200 milliseconds (ms) and in-sync evaluation period of 100 ms seem OK for enhanced Mobile Broadband (eMBB) traffic but too long for Ultra-Reliable and Low Latency Communication (URLLC) traffic since URLLC traffic has a much tighter delay budget than eMBB traffic.

For another instance, using the same threshold for out-of-sync evaluation $Q_{ut}$ and the same threshold for in-sync evaluation $Q_{in}$ for eMBB and URLLC traffic are also not optimal due since eMBB and URLLC have different requirements on control channel Block Error Rate (BLER). For some URLLC traffic when Radio Link Control (RLC) retransmission is not allowed, the required Physical Downlink Control Channel (PDCCH) BLER should be much lower than that for eMBB. Therefore, using uniform thresholds is problematic.

The basic idea of the present disclosure is to apply traffic type or network slice specific configuration for RLM in NR for multiple service providing. There are multiple configurations for multiple services (or service sets)/networks slices, the configuration including the out-of-sync evaluation period and the in-sync evaluation period, the thresholds for out-of-sync evaluation and in-sync evaluation, and the associated counter values and timers. The method for RLM configuration of coexisting multiple services is also disclosed.

With the proposed method, the radio link quality for radio link quality monitoring for different services can be differentiated monitored and evaluated according to the differentiated delay and reliability requirements so that QoS fulfillment can be improved for multiple service providing in one network.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a Core Network (CN). Some examples of a core network node include, e.g., a Mobility Management Entity (MME), a Packet Data Network (PDN) Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the CN of a cellular communications network/system.

Note that the description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system.

Note that, in the description herein, reference may be made to the term "cell"; however, particularly with respect to Fifth Generation (5G) concepts, beams may be used instead of cells and, as such, it is important to note that the concepts described herein are equally applicable to both cells and beams.

The basic idea is to apply differentiated Radio Link Monitoring (RLM) configurations for services of different Quality of Service (QoS) requirements. The services to be served by one network can be categorized into multiple service sets and one RLM configuration is applied for each service set according to the QoS requirement (e.g., delay budget and residual Hybrid Automatic Repeat Request (HARQ) error over air interface). The embodiments are described in detail below.

As a first embodiment, the services can be categorized to multiple service sets and one RLM configuration is applied for each service set. As one example, one straightforward method is to categorize the services into three sets: Ultra-Reliable and Low Latency Communication (URLLC), massive Machine Type Communication (mMTC), and enhanced Mobile Broadband (eMBB). There are three RLM configurations and each RLM configuration is applied for one service set. As another example, the service set and the associated RLM configuration can be dynamically or conditionally configured by the network according to the QoS requirements of the services via Radio Resource Control (RRC) signaling. Table 1 below exemplifies the mapping relationship between the service sets and the RLM configurations.

TABLE 1

| Service set | RLM configuration index |
| --- | --- |
| URLLC service set | 1 |
| mMTC service set | 2 |
| eMBB service set | 3 |

Service Set to RLM Configuration Mapping Table

Figure 2:
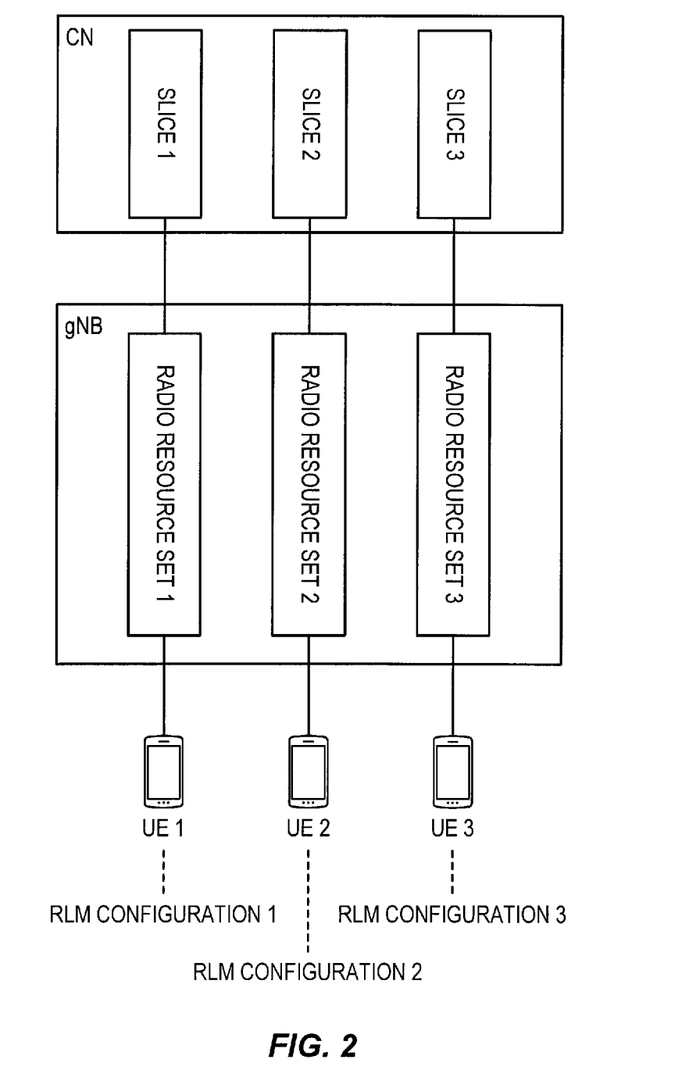
FIG. 2 illustrates one example of RLM configuration in the case of network slicing according to some embodiments of the present disclosure.

As a second embodiment, RLM configuration can be network slice specific. When there are multiple network slices, there are multiple RLM configurations and each RLM configuration is associated with one network slice. The UE served by one slice is configured with the RLM configuration associated with the network slice. FIG. 2 shows one example for RLM configuration in case of network slicing. In FIG. 2, there are three network slices and RLM configurations 1, 2, and 3 are associated with network slices 1, 2, and 3 respectively. Respectively, UEs 1, 2, and 3 served by network slices 1, 2, and 3 are configured with RLM configurations 1, 2, and 3.

As one further embodiment of the first and second embodiments, the RLM configurations can be predefined for each service (set)/network slice and the UE can determine which RLM configuration shall be applied according to the service type or selected slice.

As a third embodiment, the RLM configuration includes the configuration of the out-of-sync evaluation period (200 milliseconds (ms) in LTE) and the threshold (e.g., $Q_{out}$) to determine the out-of-sync, the maximum counter value (N310) of out-of-sync, the in-sync evaluation period (e.g., 100 ms) and the threshold ($Q_{in}$) to determine the in-sync, the value of the timer triggered by out-of-sync (T310), and the value of the timer triggered by Radio Link Failure (RLF) (e.g., T311), etc.

As a fourth embodiment, when one UE has multiple services and/or served by multiple network slices and the RLM configurations associated with the services/network slices are different, there are the following options to configure RLM:

Option 1: the RLM of different services/network slices are separately configured and the UE determine the RLF separately for each service/network slice.

Option 2: only one RLM configuration is applied in the UE. The RLM configuration associated with the service with the smallest latency and/or lowest residual HARQ error rate shall be applied. For instance, the RLM configuration with URLLC traffic shall be applied when the UE has both eMBB traffic and URLLC traffic.

As a fifth embodiment, the RLM configuration applied for a UE can be configured via on-demand system information transmission.

As a sixth embodiment, a default RLM configuration shall be preconfigured or predefined. When the network does not configure the RLM configuration or allow the UE to determine RLM configuration based on the service type or serving network slice by itself, the UE shall use default RLM configuration.

Figure 3:
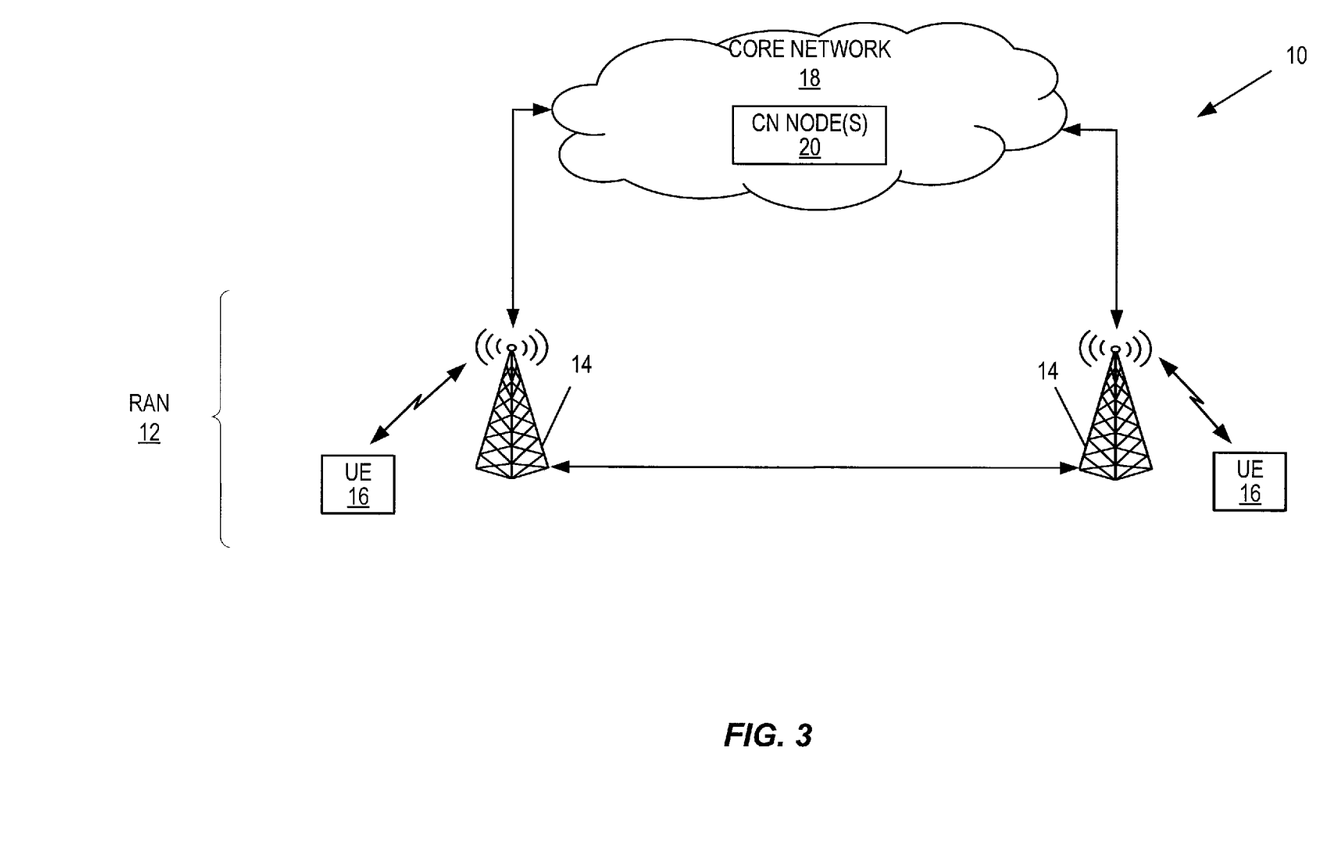
FIG. 3 illustrates one example of a cellular communications system in which embodiments of the present disclosure may be implemented.

FIG. 3 illustrates one example of a cellular communications system 10 in which embodiments of the present disclosure may be implemented. As illustrated, the cellular communications system 10 includes a Radio Access Network (RAN) 12 that includes a number of radio access nodes 14 (e.g., base stations such as, e.g., 5G New Radio Access Technology (NR) base stations (sometimes referred to as gNBs)). In some embodiments, the RAN 12 is a 5G NR RAN and the radio access nodes 14 are gNBs, where gNB is a term used to refer to 5G NR base stations. The radio access nodes 14 provide wireless, or radio, access to UEs 16 via corresponding cells or beams.

The radio access nodes 14 are connected to a core network 18. The core network 18 includes one or more core network nodes 20 such as, for example, MMEs, Serving Gateways (S-GWs), P-GWs, and/or the like.

Figure 4:
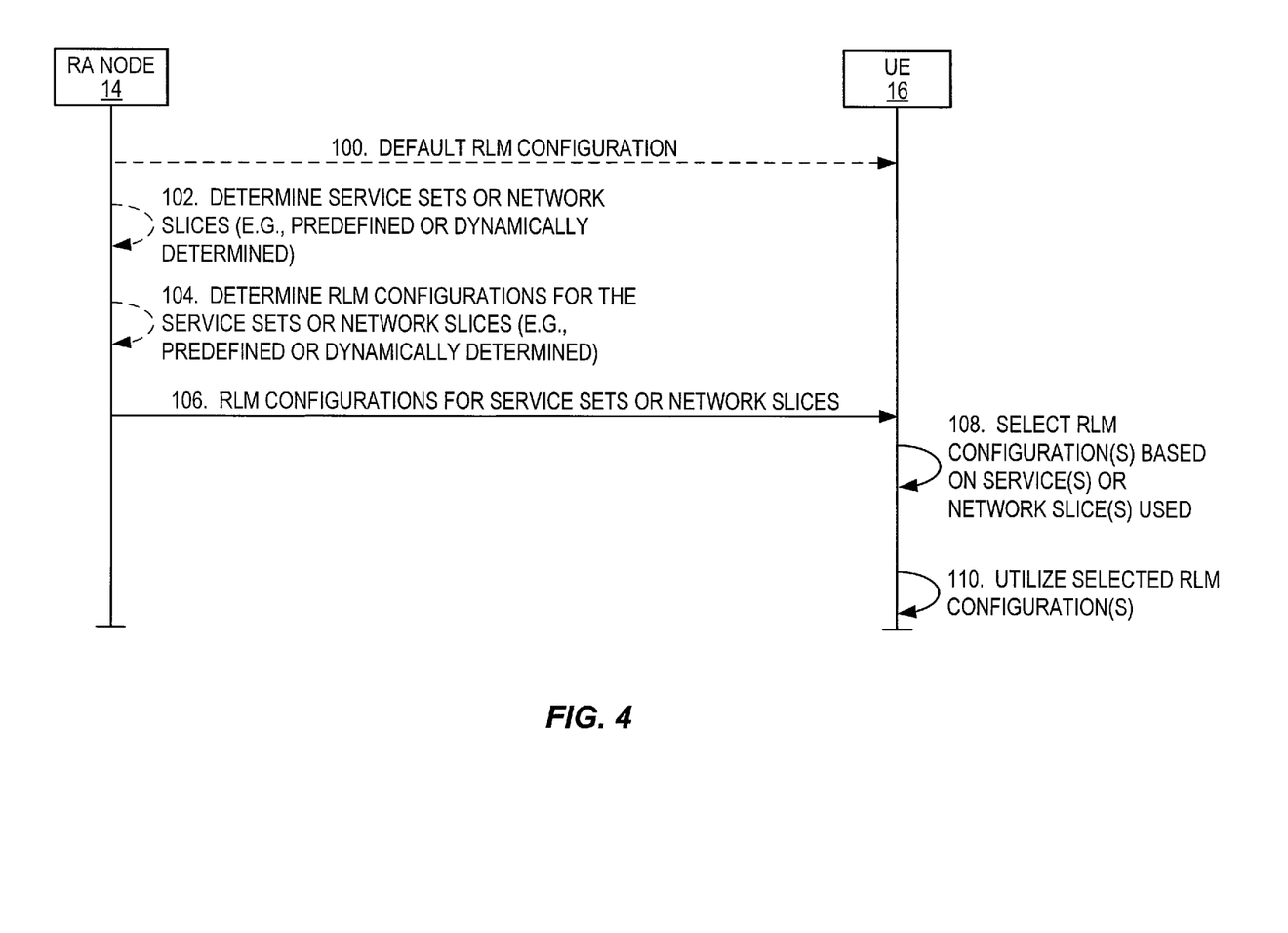
FIG. 4 illustrates the operation of a radio access node and a User Equipment device (UE) according to some embodiments of the present disclosure.

FIG. 4 illustrates the operation of a radio access node 14 and a UE 16 according to at least some of the embodiments described above. Optional steps are indicted by dashed lines. In some embodiments, the radio access node 14 sends a default RLM configuration to the UE 16 (step 100). As discussed above, in some embodiments, the default RLM configuration is used by the UE 16 if, for example, the UE 16 is not configured with another RLM configuration such as, for example, a set of RLM configurations for respective service sets or network slices or a particular RLM configuration(s) for particular service(s) (or more specifically the respective service set(s)) or network slice(s) used by the UE 16.

In some embodiments, the radio access node 14 determines a number of service sets or network slices (step 102). The service sets or network slices may be predefined (e.g., by a network operator or by a standard), dynamically or conditionally determined by the radio access node 14, or retrieved by the radio access node 14 from some other node (e.g., a core network node 20). The radio access node 14 also determines separate RLM configurations for the service sets or network slices (step 104). The RLM configurations may be predefined by standard and, as such, hard-coded into the radio access node 14, obtained from memory at the radio access node 14, or the like. Alternatively, the RLM configurations may be dynamically or conditionally determined by the radio access node 14 or some other network node based on, e.g., QoS requirements for the respective service sets or network slices.

In this embodiment, the radio access node 14 sends the RLM configurations for the service sets or network slices to the UE 16 (step 106). The radio access node 14 may, for example, send the RLM configurations once (e.g., in the case of statically defined service sets or network slices and corresponding RLM configurations) or send the RLM configurations dynamically (e.g., in the case of dynamic or conditionally determined service sets or network slices and/or dynamic or conditionally determined RLM configurations for the service sets or network slices). For example, in some embodiments, the radio access node 14 sends the RLM configurations via RRC signaling. In some other embodiments, the radio access node 14 sends the RLM configurations via system information (e.g., via on-demand system information). Note that on-demand system information is system information transmitted by the radio access node 14 on-demand (e.g., in response to some trigger from the UE 16). Further, in some embodiments, the radio access node 14 sends information that defines the service sets or information that indicates the network slices to the UE 16. This may be particularly desirable where the service sets or network slices are dynamically or conditionally configured (e.g., where the radio access node 14 or some other network node dynamically or conditionally groups services into service sets based on some metric(s) such as, e.g., QoS requirements).

At this point, the UE 16 has knowledge of the service sets or network slices and the respective RLM configurations. As such, the UE 16 selects the RLM configuration(s) for the service(s) or network slice(s) used by the UE 16 (step 108). For example, if the UE 16 is using a particular service, the UE 16 may select the RLM configuration for the corresponding service set. The UE 16 then utilizes the selected RLM configuration(s) (step 110). Notably, in some embodiments, the UE 16 may use multiple services or multiple network slices. In this case, as described above, the UE 16 may utilize the RLM configurations for the multiple services or network slices separately to, e.g., determine RLF separately for each service or network slice. Alternatively, the UE 16 may select one of the RLM configurations selected in step 108 to be used by the UE 16. For example, as described above, the UE 16 may select the RLM configuration for the service set or network slice that is used by the UE 16 and has the smallest latency and/or lowest residual HARQ error rate.

Figure 5:
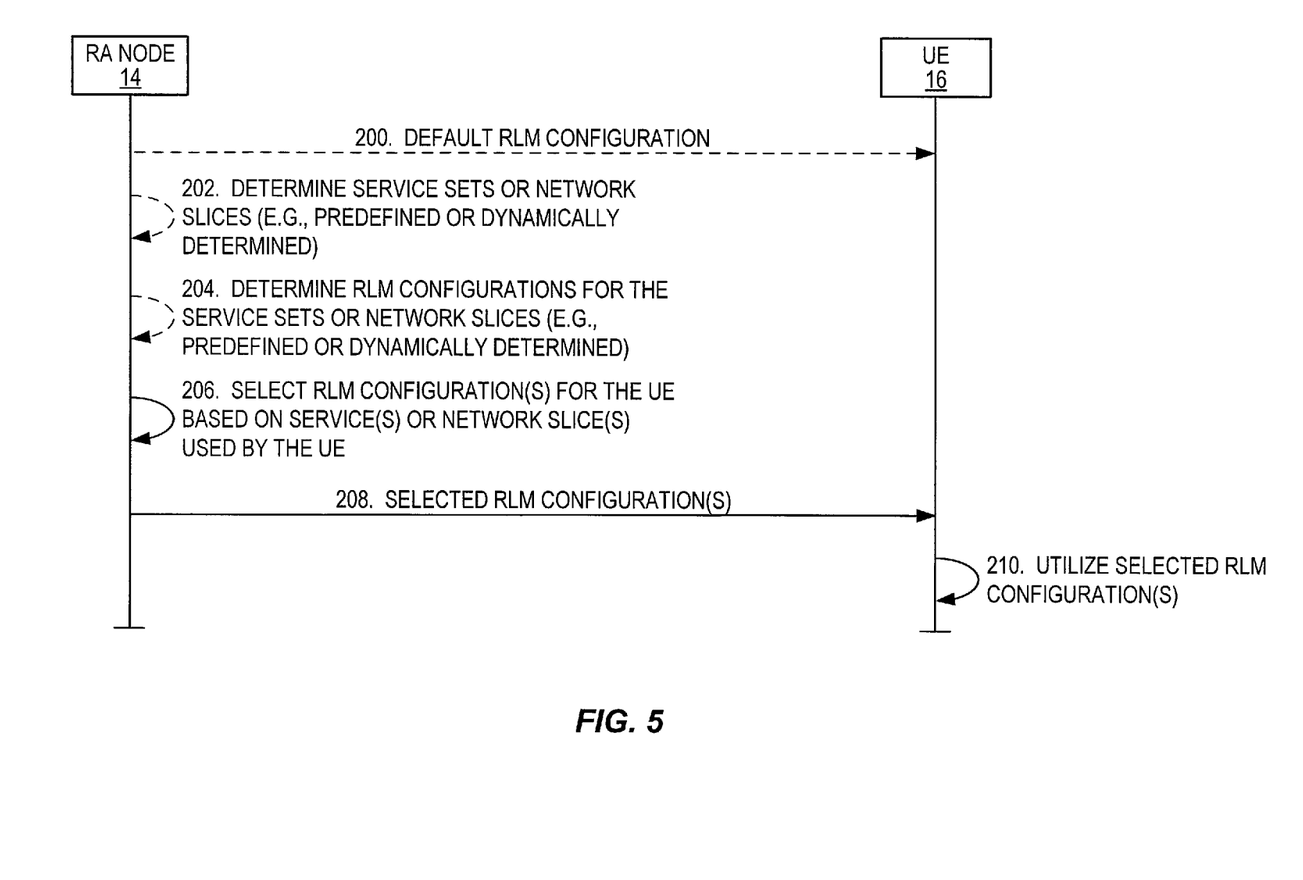
FIG. 5 illustrates the operation of a radio access node and a UE according to some other embodiments of the present disclosure.

FIG. 5 illustrates the operation of a radio access node 14 and a UE 16 according to at least some of the embodiments described above. Optional steps are indicted by dashed lines. In some embodiments, the radio access node 14 sends a default RLM configuration to the UE 16 (step 200). As discussed above, in some embodiments, the default RLM configuration is used by the UE 16 if, for example, the UE 16 is not configured with another RLM configuration such as, for example, a set of RLM configurations for respective service sets or network slices or a particular RLM configuration(s) for particular service(s) (or more specifically the respective service set(s)) or network slice(s) used by the UE 16.

In some embodiments, the radio access node 14 determines a number of service sets or network slices (step 202). The service sets or network slices may be predefined (e.g., by a network operator or by a standard), dynamically or conditionally determined by the radio access node 14, or retrieved by the radio access node 14 from some other node (e.g., a core network node 20). The radio access node 14 also determines separate RLM configurations for the service sets or network slices (step 204). The RLM configurations may be predefined by standard and, as such, hard-coded into the radio access node 14, obtained from memory at the radio access node 14, or the like. Alternatively, the RLM configurations may be dynamically or conditionally determined by the radio access node 14 or some other network node based on, e.g., QoS requirements for the respective service sets or network slices.

In this embodiment, the radio access node 14 selects the RLM configuration(s) for the service(s) or network slice(s) to be used by the UE 16 (step 206). For example, if the UE 16 is using a particular service, the radio access node 14 may select the RLM configuration for the corresponding service set. Notably, in some embodiments, the UE 16 may use multiple services or multiple network slices. In this case, as described above, the radio access node 14 may select the RLM configurations for all of the multiple services or network slices used by the UE 16. Alternatively, the radio access node 14 may select one of the RLM configurations for the service sets or network slices used by the UE 16. For example, as described above, the radio access node 14 may select the RLM configuration for the service set or network slice that is used by the UE 16 and has the smallest latency and/or lowest residual HARQ error rate requirement.

The radio access node 14 sends the selected RLM configuration(s) to the UE 16 (step 208). The radio access node 14 may, for example, select the RLM configuration(s) and send the RLM configuration(s) to the UE 16 dynamically. For example, if the UE 16 starts using a new service or a new network slice, then the radio access node 14 may select the RLM configuration(s) and send the selected RLM configuration(s) to the UE 16 based on the new service or new network slice being used by the UE 16. As another example, if the service sets or network slices and/or the RLM configurations defined for the service sets or network slices change, this may trigger the radio access node 14 to select and send the RLM configuration(s) to the UE 16. While not being limited thereto, in some embodiments, the radio access node 14 sends the RLM configuration(s) via RRC signaling. The UE 16 then utilizes the selected RLM configuration(s) (step 210).

Figure 6:
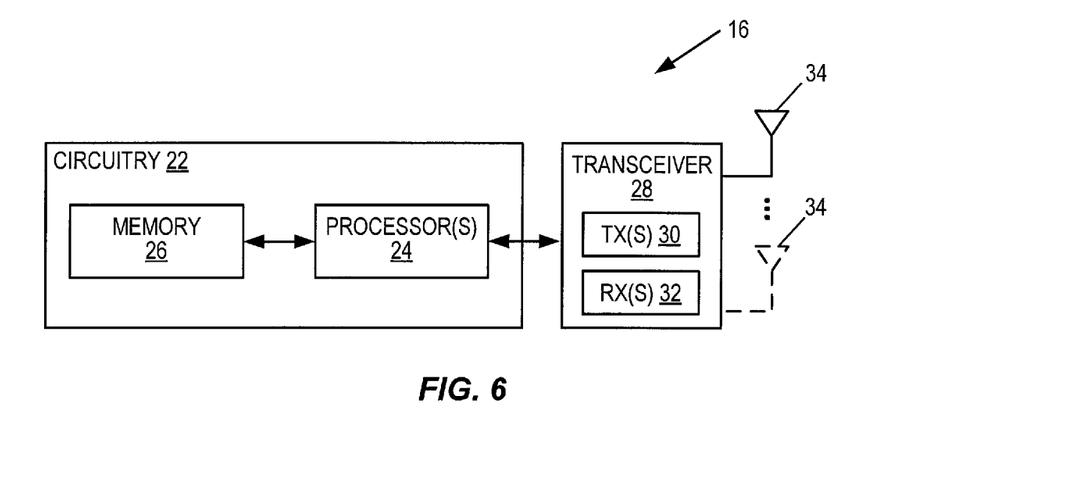
FIGS. 6 and 7 illustrate example embodiments of a UE.

FIG. 6 is a schematic block diagram of the UE 16 (or more generally a wireless device) according to some embodiments of the present disclosure. As illustrated, the UE 16 includes circuitry 22 comprising one or more processors 24 (e.g., Central Processing Units (CPUs), Application Specific Integrated Circuits (ASICs), Field Programmable Gate Arrays (FPGAs), and/or the like) and memory 26. The UE 16 also includes one or more transceivers 28 each including one or more transmitter 30 and one or more receivers 32 coupled to one or more antennas 34. In some embodiments, the functionality of the UE 16 described above may be fully or partially implemented in software that is, e.g., stored in the memory 26 and executed by the processor(s) 24.

In some embodiments, a computer program including instructions which, when executed by at least one processor, causes the at least one processor to carry out the functionality of the UE 16 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 7:
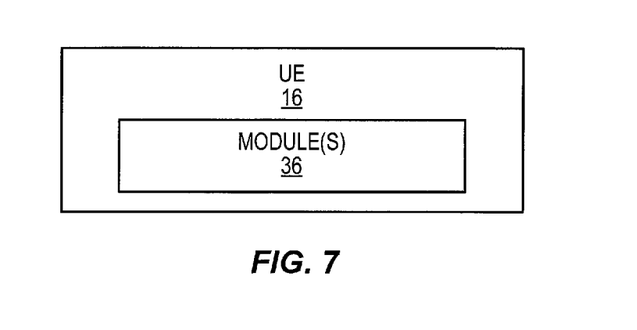

FIG. 7 is a schematic block diagram of the UE 16 (or more generally a wireless device) according to some other embodiments of the present disclosure. The UE 16 includes one or more modules 36, each of which is implemented in software. The module(s) 36 provide the functionality of the UE 16 described herein.

Figure 8:
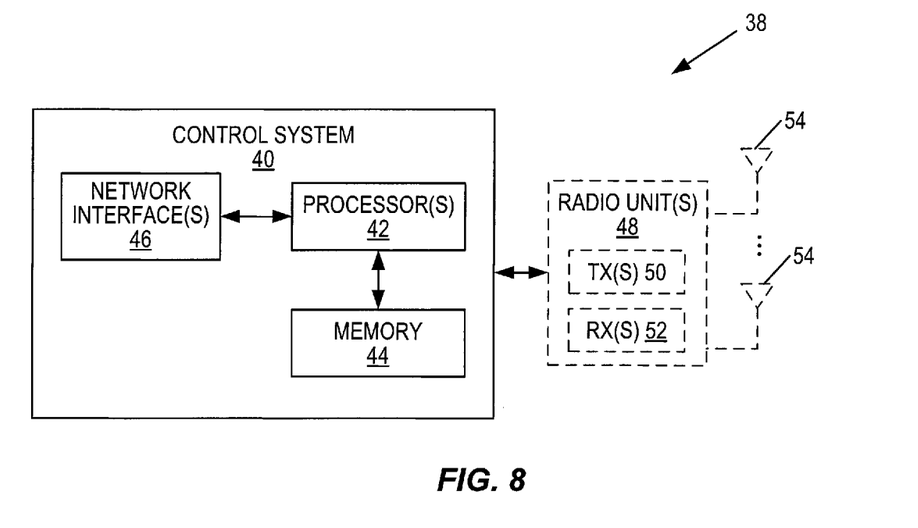
FIGS. 8 through 10 illustrate example embodiments of a network node.

FIG. 8 is a schematic block diagram of a network node 38 (e.g., the radio access node 14) according to some embodiments of the present disclosure. As illustrated, the network node 38 includes a control system 40 that includes circuitry comprising one or more processors 42 (e.g., CPUs, ASICs, FPGAs, and/or the like) and memory 44. The control system 40 also includes a network interface 46. In embodiments in which the network node 38 is the radio access node 14, the network node 38 also includes one or more radio units 48 that each include one or more transmitters 50 and one or more receivers 52 coupled to one or more antennas 54. In some embodiments, the functionality of the network node 38 or radio access node 14 described above may be fully or partially implemented in software that is, e.g., stored in the memory 44 and executed by the processor(s) 42.

Figure 9:
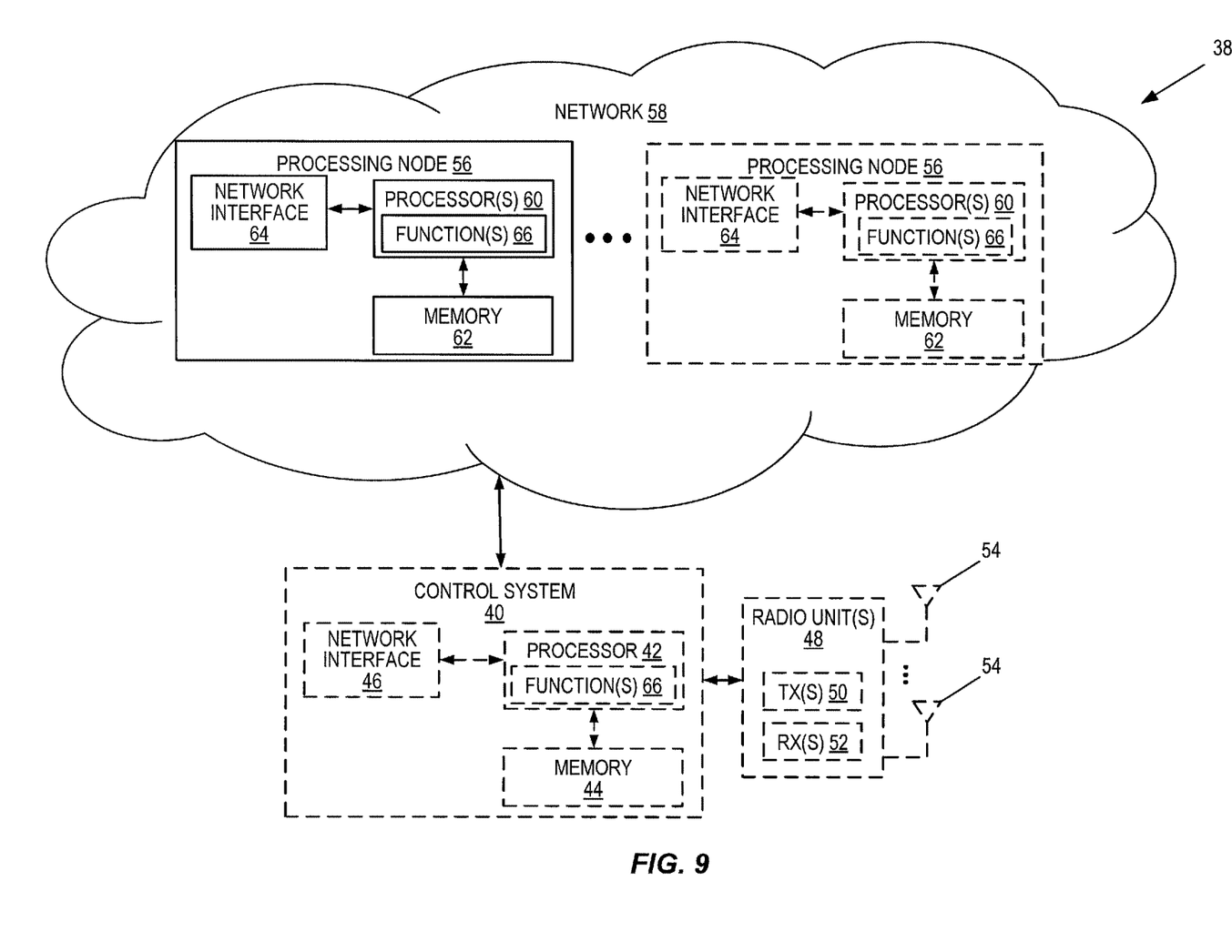

FIG. 9 is a schematic block diagram that illustrates a virtualized embodiment of the network node 38 (e.g., the radio access node 14) according to some embodiments of the present disclosure. As used herein, a "virtualized" network node 38 is a network node 38 in which at least a portion of the functionality of the network node 38 is implemented as a virtual component (e.g., via a virtual machine(s) executing on a physical processing node(s) in a network(s)). As illustrated, the network node 38 optionally includes the control system 40, as described with respect to FIG. 8. In addition, if the network node 38 is the radio access node 14, the network node 38 also includes the one or more radio units 48, as described with respect to FIG. 8. The control system 40 (if present) is connected to one or more processing nodes 56 coupled to or included as part of a network(s) 58 via the network interface 46. Alternatively, if the control system 40 is not present, the one or more radio units 48 (if present) are connected to the one or more processing nodes 56 via a network interface(s). Alternatively, all of the functionality of the network node 38 described herein may be implemented in the processing nodes 56 (i.e., the network node 38 does not include the control system 40 or the radio unit(s) 48). Each processing node 56 includes one or more processors 60 (e.g., CPUs, ASICs, FPGAs, and/or the like), memory 62, and a network interface 64.

In this example, functions 66 of the network node 38 or radio access node 14 described herein are implemented at the one or more processing nodes 56 or distributed across the control system 40 (if present) and the one or more processing nodes 56 in any desired manner. In some particular embodiments, some or all of the functions 66 of the network node 38 or radio access node 14 described herein are implemented as virtual components executed by one or more virtual machines implemented in a virtual environment(s) hosted by the processing node(s) 56. As will be appreciated by one of ordinary skill in the art, additional signaling or communication between the processing node(s) 56 and the control system 40 (if present) or alternatively the radio unit(s) 48 (if present) is used in order to carry out at least some of the desired functions. Notably, in some embodiments, the control system 40 may not be included, in which case the radio unit(s) 48 (if present) communicates directly with the processing node(s) 56 via an appropriate network interface(s).

In some embodiments, a computer program including instructions which, when executed by at least one processor, causes the at least one processor to carry out the functionality of the network node 38 (e.g., the radio access node 14) or a processing node 56 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 10:
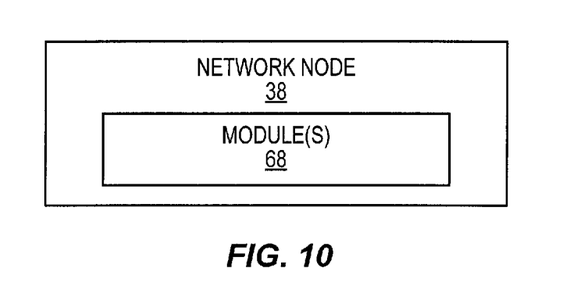

FIG. 10 is a schematic block diagram of the network node 38 (e.g., the radio access node 14) according to some other embodiments of the present disclosure. The network node 38 includes one or more modules 68, each of which is implemented in software. The module(s) 68 provide the functionality of the network node 38 or radio access node 14 described herein.

The following acronyms are used throughout this disclosure.

3GPP Third Generation Partnership Project
    5G Fifth Generation
    ASIC Application Specific Integrated Circuit
    BLER Block Error Rate
    CN Core Network
    CPU Central Processing Unit
    DRX Discontinuous Reception
    eMBB Enhanced Mobile Broadband
    eNB Enhanced or Evolved Node B
    FPGA Field Programmable Gate Array
    gNB Fifth Generation New Radio Base Station
    HARQ Hybrid Automatic Repeat Request
    LTE Long Term Evolution
    MME Mobility Management Entity
    mMTC Massive Machine Type Communication
    ms Millisecond
    MTC Machine Type Communication
    NR New Radio Access Technology
    PCFICH Physical Control Format Indicator Channel
    PDCCH Physical Downlink Control Channel
    PDN Packet Data Network
    P-GW Packet Data Network Gateway
    QoS Quality of Service
    RAN Radio Access Network
    RAT Radio Access Technology
    RLC Radio Link Control
    RLF Radio Link Failure
    RLM Radio Link Monitoring
    RRC Radio Resource Control
    RS Reference Signal
    SCEF Service Capability Exposure Function
    S-GW Serving Gateway
    TS Technical Specification
    UE User Equipment
    URLLC Ultra-Reliable and Low Latency Communication Those skilled in the art will recognize improvements and modifications to the embodiments of the present disclosure. All such improvements and modifications are considered within the scope of the concepts disclosed herein.

What is claimed is:

1. A method of a network node for providing Radio Link Monitoring, RLM, in New Radio, NR, Access Technology, comprising:
    providing, to a wireless device, a plurality of RLM configurations for a respective plurality of service sets or network slices, wherein:
        each of the plurality of service sets or network slices comprises one or more services associated with a respective set of Quality of Service, QoS, requirements; and
        the plurality of RLM configurations comprises an RLM configuration corresponding to an Ultra-Reliable and Low Latency Communication (URLLC) service set;
    wherein, for each service set or network slice, the respective RLM configuration comprises at least one of: a maximum counter value of out-of-sync and a value of a timer triggered by radio link failure.

2. The method of claim 1 wherein, for each service set or network slice, the respective RLM configuration further comprises at least one of: a configuration of an out-of-sync evaluation period and a threshold to determine out-of-sync, an in-sync evaluation period and a threshold to determine in-sync, and a value of a timer triggered by out-of-sync.

3. The method of claim 1 wherein providing the plurality of RLM configurations to the wireless device comprises providing the plurality of RLM configurations to the wireless device via dynamic signaling or system information.

4. The method of claim 1 wherein each RLM configuration of the plurality of RLM configurations for each respective service set or network slice of the plurality of service sets or network slices is conditionally determined.

5. The method of claim 1 wherein the plurality of service sets are conditionally configured.

6. A method of a network node for providing Radio Link Monitoring, RLM, in New Radio, NR, Access Technology, comprising:
    selecting, based on one or more services or one or more network slices used by a wireless device, one or more RLM configurations from a plurality of RLM configurations for a respective plurality of service sets or network slices, wherein:
        each of the plurality of service sets or network slices comprises one or more services associated with a respective set of Quality of Service, QoS, requirements; and
        the plurality of RLM configurations comprises an RLM configuration corresponding to an Ultra-Reliable and Low Latency Communication (URLLC) service set; and
    providing the one or more selected RLM configurations to the wireless device;
    wherein, for each service set or network slice, the respective RLM configuration comprises at least one of: a maximum counter value of out-of-sync and a value of a timer triggered by radio link failure.

7. The method of claim 6 wherein, for each service set or network slice, the respective RLM configuration further comprises at least one of: a configuration of an out-of-sync evaluation period and a threshold to determine out-of-sync, an in-sync evaluation period and a threshold to determine in-sync, and a value of a timer triggered by out-of-sync.

8. The method of claim 6 wherein providing the one or more selected RLM configurations to the wireless device comprises providing the one or more selected RLM configurations to the wireless device via dynamic signaling.

9. The method of claim 6 wherein each RLM configuration of the plurality of RLM configurations for each respective service set or network slice of the plurality of service sets or network slices is conditionally determined.

10. The method of claim 6 wherein the plurality of service sets are conditionally configured.

11. A method of a wireless device for performing Radio Link Monitoring, RLM, in New Radio, NR, access technology, comprising:
selecting, based on one or more services or one or more network slices used by the wireless device, one or more RLM configurations from a plurality of RLM configurations for a respective plurality of service sets or network slices, wherein:
each of the plurality of service sets or network slices comprises one or more services associated with a respective set of Quality of Service, QoS, requirements; and
the plurality of RLM configurations comprises an RLM configuration corresponding to an Ultra-Reliable and Low Latency Communication (URLLC) service set; and
utilizing the one or more selected RLM configurations for RLM at the wireless device;
wherein, for each service set or network slice, the respective RLM configuration comprises at least one of: a maximum counter value of out-of-sync and a value of a timer triggered by radio link failure.

12. The method of claim 11, further comprising receiving, from a network node, the plurality of RLM configurations for the respective plurality of service sets or network slices.

13. The method of claim 12 wherein receiving the plurality of RLM configurations for the respective plurality of service sets or network slices comprises receiving the plurality of RLM configurations for the respective plurality of service sets or network slices via dynamic signaling.

14. The method of claim 11 wherein, for each service set or network slice, the respective RLM configuration further comprises at least one of: a configuration of an out-of-sync evaluation period and a threshold to determine out-of-sync an in-sync evaluation period and a threshold to determine in-sync, and a value of a timer triggered by out-of-sync.

15. The method of claim 11 wherein each RLM configuration of the plurality of RLM configurations for each respective service set or network slice of the plurality of service sets or network slices is conditionally determined.

16. The method of claim 11 wherein the plurality of service sets are conditionally determined.

17. The method of claim 11 wherein the one or more selected RLM configurations comprise two or more RLM configurations, and utilizing the one or more selected RLM configurations for RLM at the wireless device comprises utilizing the two or more RLM configurations separately; or
wherein the one or more selected RLM configurations comprises two or more RLM configurations, and utilizing the one or more selected RLM configurations for RLM at the wireless device comprises:
selecting one of the two or more RLM configurations based on at least one metric; and
utilizing the one of the two or more RLM configurations.

18. A method of a wireless device for performing Radio Link Monitoring, RLM, in New Radio, NR, Access Technology, comprising:
receiving, from a network node, one or more select RLM configurations from a plurality of RLM configurations, the plurality of RLM configurations being for a respective plurality of service sets or network slices, wherein:
each of the plurality of service sets or network slices comprises one or more services associated with a respective set of Quality of Service, QoS, requirements; and
the plurality of RLM configurations comprises an RLM configuration corresponding to an Ultra-Reliable and Low Latency Communication (URLLC) service set; and
utilizing the one or more select RLM configurations for RLM at the wireless device;
wherein, for each service set or network slice, the respective RLM configuration comprises at least one of: a maximum counter value of out-of-sync and a value of a timer triggered by radio link failure.

19. The method of claim 18 wherein, for each service set or network slice, the respective RLM configuration further comprises at least one of: a configuration of an out-of-sync evaluation period and a threshold to determine out-of-sync an in-sync evaluation period and a threshold to determine in-sync, and a value of a timer triggered by out-of-sync.

20. The method of claim 18 wherein receiving the one or more selected RLM configurations comprises receiving the one or more selected RLM configurations via dynamic signaling.

21. The method of claim 18 wherein the plurality of RLM configurations for the plurality of service sets or network slices are conditionally determined.

22. The method of claim 18 wherein the plurality of service sets are conditionally determined.

23. The method of claim 18 wherein the one or more select RLM configurations comprise two or more select RLM configurations, and utilizing the one or more select RLM configurations for RLM at the wireless device comprises utilizing the two or more select RLM configurations separately; or
wherein the one or more select RLM configurations comprise two or more select RLM configurations, and utilizing the one or more select RLM configurations for RLM at the wireless device comprises:
selecting one of the two or more select RLM configurations based on at least one metric; and
utilizing the one of the two or more select RLM configurations.

* * * * *

UNITED STATES PATENT AND TRADEMARK OFFICE
CERTIFICATE OF CORRECTION

| | | |
|---|---|---|
| PATENT NO. | : 11,115,267 B2 | Page 1 of 1 |
| APPLICATION NO. | : 16/346183 | |
| DATED | : September 7, 2021 | |
| INVENTOR(S) | : Liu et al. | |

It is certified that error appears in the above-identified patent and that said Letters Patent is hereby corrected as shown below:

On the Title Page

On Page 2, in Item (56), under "OTHER PUBLICATIONS", in Column 2, Line 9, delete "forfeMTC," and insert -- for feMTC, --, therefor.

In the Specification

In Column 2, Line 62, delete "$Q_{ut}$" and insert -- $Q_{out}$ --, therefor.

In Column 5, Line 66, delete "indicted" and insert -- indicated --, therefor.

In Column 7, Line 5, delete "indicted" and insert -- indicated --, therefor.

In the Claims

In Column 11, Line 50, in Claim 14, delete "out-of-sync" and insert -- out-of-sync, --, therefor.

In Column 12, Line 35, in Claim 19, delete "out-of-sync" and insert -- out-of-sync, --, therefor.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*